United States Patent [19]

Watson

[11] 3,880,765

[45] Apr. 29, 1975

[54] WATERFLOOD PROCESS USING ALKOXYLATED LOW MOLECULAR WEIGHT ACRYLIC ACID POLYMERS AS SCALE INHIBITORS

[75] Inventor: James D. Watson, Houston, Tex.

[73] Assignee: Nalco Chemical Company, Chicago, Ill.

[22] Filed: Nov. 12, 1973

[21] Appl. No.: 415,207

[52] U.S. Cl............ 252/8.55 D; 166/275; 210/58; 252/8.55 B; 252/180; 260/88.7 B
[51] Int. Cl. ....................... C02b 5/06; E21b 43/20
[58] Field of Search .......... 252/8.55 D, 8.55 B, 180; 166/274, 275; 210/58

[56] References Cited
UNITED STATES PATENTS

| | | | |
|---|---|---|---|
| 3,293,152 | 12/1966 | Herbert et al. | 252/180 X |
| 3,419,502 | 12/1968 | Newman | 252/180 |
| 3,480,083 | 11/1969 | Oleen | 166/275 |
| 3,578,589 | 5/1971 | Hwa | 210/58 |
| 3,827,977 | 8/1974 | Miles et al. | 252/8.55 |
| 3,841,401 | 10/1974 | Restaino et al. | 166/275 X |

*Primary Examiner*—Herbert B. Guynn
*Attorney, Agent, or Firm*—John G. Premo; James F. Lambe

[57] ABSTRACT

Low molecular weight alkoxylated acrylic acid polymers are introduced into one or more water injection wells and forced through the underground formation to a producing well or wells without being destroyed during such passage.

2 Claims, No Drawings

WATERFLOOD PROCESS USING ALKOXYLATED LOW MOLECULAR WEIGHT ACRYLIC ACID POLYMERS AS SCALE INHIBITORS

The invention is concerned with the prevention of hardness scale deposits on metal surfaces in contact with hard water containing hardness scale-forming ions and with the preparation of compounds or compositions which are effective for this purpose. In particular, the invention is concerned with scale prevention in natural brines on ferrous metal walls and other surfaces in oil producing and waterflood systems.

Inorganic polyphosphates have long been the most effective and economical sequestering agents used for the prevention of alkaline deposits in both oil producing and waterflood systems. Inorganic polyphosphates have been added to water in waterflood systems in an effort to alleviate corrosion and scale formation.

The polyphosphates suffer from the objection that under the conditions present in an oil-bearing formation they can undergo reversion to orthophosphates which in turn form insoluble salts with calcium, magnesium, barium and strontium. Calcium and magnesium are usually present in substantial amounts in oil-bearing formations and barium and strontium salts are often present in smaller amounts. The formation of insoluble salts as previously indicated would tend to plug the oil-bearing strata and reduce the chances of obtaining an improvement in the recovery of the oil.

It would be desirable to provide a process in which a chemical is added to an injection well which will inhibit scaling of equipment and plugging of the well and will retain its identity while passing through the underground formation to the producing well or wells where it is also effective as a scale inhibitor. An object of this invention is to provide such a process.

THE INVENTION

In accordance with the invention it has been found that low molecular weight, e.g. 3,000 to 20,000 water-soluble acrylic acid polymers, which have been reacted with from 5 to 60% by weight of an alkylene oxide are effective as scale inhibitors and can be added to an injection well or wells in a waterflood system and will pass through the underground formation to a producing well or wells without being precipitated or adsorbed in the formation during such passage. Thus, protection is afforded against scale formation in the producing well or wells as well as the injection well or wells. This protection is especially useful in a number of areas where scaling of metal surfaces, particularly ferrous metal surfaces, by barium sulfate, calcium sulfate and/or calcium carbonate is a problem. By control of scale formation, breakdowns, maintenance, cleaning and repairs caused or necessitated by scale formation can be minimized.

The dosage of the low molecular weight alkoxylated water-soluble acrylic acid polymers should be sufficient to give a scale inhibiting amount in the producing well of at least 0.5 parts per million (ppm). Normally the amount added to the water in the injection well will be at least 10 ppm but in some cases up to 100 ppm and even as high as 200 to 500 ppm can be used. They are particularly effective in treating injection waters which contain from 500 to 10,000 ppm of calcium.

THE ALKOXYLATED WATER-SOLUBLE ACRYLIC ACID POLYMERS

The low molecular weight water-soluble acrylic acid polymers include the homo- and copolymers of acrylic acid. These polymeric intermediates to be effective in the proximities of the invention should have a molecular weight within the range of 3,000 to 20,000 and preferably within the weight range of 5,000 to 15,000. These starting polymers may be prepared by a wide variety of known synthetic techniques which includes the polymerization of acrylic acid or methacrylic acid or by hydrolysis of polyacrylonitriles or polyacrylamides.

The starting copolymers of acrylic acid should contain at least 50% by weight of these monomeric moieties and preferably should contain from 70 to 80% thereof. The copolymers may be prepared copolymerizing acrylic acid and another vinyl monomer such as, for instance, acrylamide vinyl acetate, maleic anhydride and the like.

A preferred group of copolymers are produced by the hydrolysis of low molecular weight polyacrylonitriles. Polymers of this type contain from 20 to 30% by weight of amide groups and from 70 to 80% by weight of carboxyl groups. Their molecular weight is within the range of from 5,000 to 40,000. Polymers of this type are described in detail in U.S. Pat. No. 3,419,502, the disclosure of which is incorporated herein by reference.

ALKOXYLATION OF THE COPOLYMERS

The starting copolymers previously described when used to practice this invention must be reacted with a lower alkylene oxide with ethylene oxide being most preferred. The amount of alkylene oxide which will hereinafter be described in relation to ethylene oxide which is intended to include the lower alkylene oxides including propylene oxide, may vary between 2 to 60% by weight of the starting polymer and preferably is within the range of 3 to 30% by weight of the starting polymer. While it is possible to react the starting polymers with ethylene oxide, it is also possible to prepare the ethoxylated polymers by first reacting the starting monomer with ethylene oxide and then conducting an appropriate polymerization reaction to produce the finished ethoxylated polymer.

To illustrate the two different techniques for preparing the ethoxylated polymer the following examples are presented below:

EXAMPLE 1

(ETHOXYLATION METHOD 1)

To a homopolymer of acrylic acid, which may be prepared by polymerizing acrylic acid or by the hydrolysis of an appropriate molecular weight acrylonitrile there is added a small amount of potassium hydroxide or other base into an autoclave. The polymer which previously has been added to the autoclave is in the presence of from about 5 to 60% by weight of water. The temperature of the autoclave is elevated to about 100°C. and maintained throughout the entire ethoxylation procedure. Upon reaching 100°C. an appropriate weight percent of ethylene oxide is added using nitrogen pressure. The ethylene oxide is added over a period of time ranging between 20 minutes to 2 hours. At the end of the addition the autoclave is allowed to cool and is then vented. After this process the ethoxylation product is quickly neutralized with a dilute solution of sodium hydroxide.

EXAMPLE 2
(ETHOXYLATION METHOD 2)

Neat acrylic acid and a small amount of catalyst (usually $BF_3$) was added to an autoclave and heated to ≈ 40°C. With water coils on for cooling the ethylene oxide was slowly added using nitrogen pressure. The addition rate was regulated so that the temperature stayed ≈ 40° to 80°C. After all of the ethylene oxide was added, the product was cooled to room temperature. After the ethoxylated acrylic acid is recovered it is then polymerized with a free radical initiator using known polymerization techniques to produce an ethoxylated polyacrylic acid polymer having specifications of the type previously described.

To illustrate the various compositions of the invention, TABLE I is presented below:

TABLE I

| Chemical No. | % Acrylic Acid | % Ethylene Oxide | Ethoxylation Method |
|---|---|---|---|
| 1 | 22 | 20 | 1 |
| 2 | 24 | 11 | 1 |
| 3 | 26 | 5.9 | 1 |
| 4 | 24 | 11 | 1 |
| 5 | 23 | 16 | 1 |
| 6 | 22 | 20 | 1 |
| 7 | 20 | 27 | 1 |
| 8 | 18 | 4.3 | 2 |
| 9 | 18 | 4.3 | 2 |
| 10 | 18 | 4.2 | 2 |
| 11 | 17 | 5.6 | 2 |
| 12 | 15 | 7.2 | 2 |
| 13 | 14 | 8.8 | 2 |
| 14 | 18 | 4.1 | 2 |
| 15 | 14 | 8.6 | 2 |
| 16 | 16 | 6.3 | 2 |
| 17 | 15 | 8.5 | 2 |
| 18 | 19 | 13 | 1 |
| 19 | 21 | 4.7 | 1 |
| 20 | 20 | 9.1 | 1 |
| 21 | 19 | 8.9 | 1 |
| 22 | 19 | 13 | 1 |
| 23 | 19 | 17 | 1 |
| 24 | 18 | 24 | 1 |
| 25 | 17 | 5.6 | 2 |
| 26 | 22 | 14 | 2 |
| 27 | 27 | 16 | 2 |
| 28 | 27 | 16 | 2 |
| 29 | 24 | 14 | 2 |
| 30 | 22 | 13 | 2 |
| 31 | 21 | 12 | 2 |
| 32 | 21 | 12 | 2 |
| 33 | 24 | 14 | 2 |
| 34 | 22 | 13 | 2 |
| 35 | 21 | 12 | 2 |
| 36 | 21 | 12 | 2 |
| 37 | 27 | 16 | 2 |

EVALUATION OF THE INVENTION

The ethoxylated polymers of the invention are particularly good scale inhibitors and tend to remain in solution in the presence of large quantities of calcium salts. This particular and unique property of the compounds allows them to stabilize large quantities of heavy metal ions which would normally tend to precipitate or plug an underground formation yet, at the same time, the compounds remaining in solution do not form precipitates with heavy metals, particularly calcium. Thus, by maintaining good solubility characteristics in high brine type waters, the ethoxylated polymers used in the practice of the invention are able to carry through an entire underground formation without precipitating thus effectively allowing treatment of a large area of subterranean formation which characteristic has not heretofore been available by using most known scale inhibiting chemicals.

To evaluate the effectiveness of the compositions two tests were employed. One is a Calcium Stability Test while the other is a Calcium Carbonate Deposition Test. These test procedures are set forth below:

CALCIUM STABILITY TEST

Relative calcium stabilities were determined using a 160°F. test. Five percent NaCl brines containing various amounts of calcium and 1% of the chemicals under test were heated in a 160°F. water bath for at least 1 hour. Then while constantly stirring and monitoring the pH of each solution with a pH meter the pH of each solution was raised using sodium hydroxide solution until the solution became slightly cloudy or hazy. The pH at which a slight haze or cloud developed was called the cloud point.

The $CaCO_3$ Brine C was used for a room temperature calcium stability test. The cloud point of 1% chemical — 99% Brine C solutions were determined.

```
Brine C
12,160 mg $CaCl_2 . 2 H_2O$
 3,680 mg $MgCl_2 . 2 H_2O$    per liter of distilled water
66,000 mg NaCl
```

Various chemicals were subjected to the Calcium Stability Test with the results being shown in TABLE II below:

TABLE II

Test A

Calcium Stability Test using $CaCO_3$ No. 1 brine
1% chemical

| Chemical | Room Temperature pH at Cloud Point | 160°F. pH at Cloud Point |
|---|---|---|
| 1 | 10.3 | |
| 2 | 10.4 | 5.5 |

Test B

Calcium Stability Test on chemical 2

| % No. 1 Brine | ppm Calcium Carbonate | Cloud Pt. at pH |
|---|---|---|
| 5 | 420 | >12.5 |
| 10 | 840 | 12.0 |
| 20 | 1680 | 11.8 |
| 40 | 3360 | 9.8 |
| 50 | 4200 | 8.7 |
| 60 | 5040 | 8.5 |
| 80 | 6720 | 5.7 |
| 100 | 8400 | 5.7 |

Test C

| Chemical | Calcium (mg/l) | pH at Cloud Point |
|---|---|---|
| 19 | 1000 | 11.8 |
| " | 2000 | 5.1 |
| 20 | 2000 | 5.1 |
| 21 | 1000 | 11.7 |
| " | 2000 | 5.3 |
| 22 | 2000 | 11.5 |
| " | 3000 | 5.0 |
| 23 | 2000 | |
| " | 3000 | |
| " | 4000 | |
| " | 5000 | 11.2 |
| " | 7000 | 5.1 |
| " | 10000 | |

TABLE II-Continued

Test D

CaCO$_3$ No. 1 brine (no dilution) at 160°F. 1% chemical

| Chemical | pH | After 30 Min. | After 20 Hrs. |
|---|---|---|---|
| 23 | 8.0 | Clear | Clear |
| " | 9.0 | " | " |
| " | 9.7 | " | " |

Test E 5000 mg/l Ca Brine in 5% NaCl at room temperature

| Chemical | pH at Cloud Pt. |
|---|---|
| 22 | 11.7 |

Test F

Heated brines to 160°F. prior to adding 1% chemical brines contained 5% NaCl

| Chemical | Calcium(mg/l) | pH at Cloud Pt. |
|---|---|---|
| 23 | 5000 | 11.1 |
| " | 7000 | 5.0 |
| 8 | 2000 | 8.4 |
| " | 3000 | 5.2 |
| 10 | 1000 | 11.8 |
| 9 | 3000 | 5.3 |
| 11 | 2000 | 11.7 |
| 25 | 5000 | 5.4 |

Test G

| Chemical | Calcium(mg/l) | pH at Cloud Pt. |
|---|---|---|
| 9 | 2000 | 11.5 |
| 10 | 2000 | 5.8 |
| 25 | 4000 | 11.3 |
| 11 | 3000 | 6.0 |
| 12 | 4000 | 11.4 |
| " | 5000 | 5.6 |
| 13 | 10000 | 11.2 |
| 25 | 3000 | 11.4 |
| " | 4000 | 5.5 |

Test H

Heated brines to 160°F. prior to adding 1% chemical Brines made with 5% NaCl

| Chemical | Calcium(mg/l) | pH at Cloud Pt. |
|---|---|---|
| 23 | 5000 | 11.3 |
| " | 7000 | 5.4 |
| 13 | 10000 | 11.1 |
| 26 | 10000 | 11.1 |
| 17 | 7000 | 11.1 |
| " | 10000 | 5.0 |
| 29 | 5000 | 10.6 |
| " | 7000 | 5.8 |
| 33 | 5000 | 10.6 |
| " | 7000 | 10.0 |
| " | 10000 | 5.8 |

Test I

Heated brines to 160°F. prior to adding 1% chemical Brines made with 5% NaCl

| Chemical | Calcium(mg/l) | pH at Cloud Pt. |
|---|---|---|
| 23 | 5000 | 11.3 |
| " | 7000 | 5.3 |
| 29 | 5000 | 10.3 |
| " | 7000 | 6.2 |
| 33 | 5000 | 11.0 |
| " | 7000 | 10.4 |
| " | 10000 | 8.0 |
| 18 | 2000 | 11.3 |
| " | 3000 | 5.1 |

Test J

Brines (5% NaCl) heated to 160°F. before adding 1% chemical

| Chemical | Calcium(mg/l) | pH at Cloud Pt. |
|---|---|---|
| 23 | 5000 | 11.2 |
| " | 7000 | 10.8 |
| " | 10000 | 4.6 |
| 25 | 4000 | 11.1 |
| " | 5000 | 5.1 |
| 29 | 5000 | 10.7 |
| " | 7000 | 8.6 |
| *33 | 5000 | 10.7 |
| " | 7000 | 9.2 |
| " | 10000 | 5.9 |
| 11 | 2000 | 11.6 |
| " | 3000 | 11.4 |
| " | 4000 | 11.1 |
| 12 | 4000 | 11.5 |
| " | 5000 | 11.3 |
| " | 7000 | 11.1 |
| " | 10000 | 4.4 |
| 13 | 10000 | 11.2 |

* Exposed 1% solution in 5000 mg/l Ca brine and straight chemical to 300°F. for three days, then checked cloud points. Both solutions had cloud pt. at pH 4.9 on 5000 mg/l Ca$^{++}$.

Test K

Added 1% chemical to different Calcium level brines (containing 5% NaCl) and heated at 160°F. 1 hr. before running cloud point

| Chemical | Calcium(mg/l) | pH at Cloud Pt. |
|---|---|---|
| 33 | 5000 | 10.6 |
| " | 5000 | 10.3 |
| " | 7000 | 5.8 |
| " | 7000 | 5.8 |
| " | 10000 | 4.7 |
| 12 | 5000 | 11.0 |
| " | 5000 | 10.9 |
| " | 7000 | 4.7 |
| " | 7000 | 4.6 |
| 33 | 6000 | 8.2 |
| " | 6000 | 7.9 |
| 12 | 6000 | 10.7 |
| " | 6000 | 10.7 |

Test L

Checked Chemical 33 in 10% NaCl at 160°F. Used 100 mls. total volume

| Mls. Brine "M" | Calcium (mg/l) | pH at Cloud Pt. |
|---|---|---|
| 12.6 | 5000 | 10.3 |
| 15.1 | 6000 | 5.4 |
| 17.6 | 7000 | 5.3 |
| 25.2 | 10000 | 5.3 |

Heated 1% chemical 33 in 10% NaCl at 265°F. 3 days, then checked cloud pt. at 160°F. using 6.3 mls. brine "M" and 43.7 mls. 1% chemical 33 pH 4.3 at cloud pt.

Test M

Chemical 33 calcium stability in 10% NaCl at pH 13 and room temperature

| Mls. Brine "M" | Calcium(mg/l) | Cloud Pt. Appearance |
|---|---|---|
| .06 | 23.8 | Clear |
| .10 | 39.7 | Very Slight Haze |
| .14 | 55.6 | Hazy |

Heated 1% chemical 33 at 265°F. 1 hour and checked stability

| Mls. Brine "M" | Calcium(mg/l) | Appearance |
|---|---|---|
| .06 | 23.8 | Sl. Haze |

Adjusted 10% NaCl to pH 13 at NaOH Then added 1% chemical and ran cloud pt. by adding brine "M"

Test N

Calcium stability of chemical 33 at pH 13

Tested at 265°F. in 10% NaCl adjusted 10% NaCl to pH 13 with NaOH. Then added 1% chemical and ran visual cloud pt. by adding Brine "M" of CaSO$_4$ Brine

| Time at 265°F. | Mls. Brine "M" | Calcium(mg/l) | Appearance |
|---|---|---|---|
| 0 min. | .06 | 23.8 | Clear |
| " | .10 | 39.7 | Hazy |
| 15 min. | .06 | 23.8 | Clear |
| " | .10 | 39.7 | Hazy |

TABLE II-Continued

Test N

Calcium stability of chemical 33 at pH 13

Tested at 265°F in 10% NaCl adjusted 10% NaCl to pH 13 with NaOH. Then added 1% chemical and ran visual cloud pt. by adding Brine "M" of $CaSO_4$ Brine

| Time at 265°F | Mls. Brine "M" | Calcium(mg/l) | Appearance |
|---|---|---|---|
| 30 min. | .06 | 23.8 | Clear |
| " | .10 | 39.7 | Hazy |
| 45 min. | .06 | 23.8 | Hazy |
| 1 hr. | .06 | 23.8 | Very Hazy |
| 1 hr. | .04 | 15.9 | Clear |
| 2 hr. | .04 | 15.9 | Very Hazy |
| 2 hr. | .02 | 8.0 | Clear |
| 2 hr. | .04 | 15.9 | Very Hazy |
| 3 hr. | .02 | 8.0 | Very Hazy |

CALCIUM CARBONATE DEPOSITION TEST

APPARATUS:

1. Constant temperature bath (100° to 200°F.)
2. Glass test cells (4 oz. bottles with screw lid)
3. Synthetic brines

| | | |
|---|---|---|
| A. | 12.16 | gms/L $CaCl_2.2H_2O$ |
| | 3.68 | gm/L $MgCl_2.6H_2O$ |
| B. | 7.36 | gms/L $NaHCO_3$ |
| | 29.4 | mg/L $Na_2SO_4$ |
| | 66 | gm/L NaCl |

4. Graduated cylinders 2–100 ml
5. 1% solutions of inhibitors to be tested
6. Pipettes: 1—0.1 ml, 1—1.0 ml and 1—10 ml
7. 125 ml Erlenmeyer flasks for each inhibitor to be tested
8. Standard EDTA solution (1 ml = 1 mg of $CaCO_3$)
9. 1 Normal sodium hydroxide
10. Ammonium purpurate indicator
11. 10 ml micro buret

PROCEDURE:

1. Using the 1% solutions of inhibitors, pipette the desired amount of inhibitor into each test cell. (Duplicates should be run of each concentration.)
2. Two controls (blanks) are set up with each test. Control contains no inhibitor.
3. Brines A and B should be saturated with $CO_2$ for 30 minutes before using.
4. Add 50 ml of Brine A and B to each test cell.
5. Cap test cells and agitate to thoroughly mix brines and chemicals.
6. Put test cell in water batch at 160°F. for 24 hours.
7. After exposure at the 160° temperature for 24 hours, the test cells are removed and allowed to cool to room temperature.
8. Pipette 1 ml of the brine from each test cell and transfer to the Erlenmeyer flask.
9. Add 50 ml of distilled water to the Erlenmeyer.
10. Add 2 ml of 1N sodium hydroxide.
11. Add a small amount of ammonium purpurate indicator and titrate with the EDTA solution. The color changes from pink to violet.
12. The amount of $CaCO_3$ retained in solution is computed by multiplying the ml of standard EDTA solution used by 1,000. The results are expressed as calcium carbonate.
13. A typical scale evaluation is found below:

Calcium Carbonate Retained in Solution (mg/L)

| Chemical | 1 ppm | 3 ppm | 5 ppm | 10 ppm | 20 ppm |
|---|---|---|---|---|---|
| A | 3,000 | 3,400 | 3,800 | 4,000 | 4,300 |
| B | 3,500 | 4,000 | 4,100 | 4,100 | 4,100 |
| C | 3,600 | 4,300 | 4,300 | 4,300 | 4,300 |
| Blank (after precipitation) 2,600 | | | | | |
| Blank (before precipitation) 4,300 | | | | | |

Several of the chemicals were subjected to the Calcium Carbonate Deposition Test using different brines. The results of these tests are shown in TABLE III below:

TABLE III

CALCIUM CARBONATE DEPOSITION TEST
(Dosage in Parts Per Million)

| CHEMICAL | 3 | 4 | 5 | 6 | 7 | 8 | 9 | 10 | 15 | 20 | 30 | 50 |
|---|---|---|---|---|---|---|---|---|---|---|---|---|
| 1 | | 3100 | 3500 | 3600 | 3700 | | | 3700 | | 4000 | 4000 | 4100 |
| 2 | 3300 | 3400 | 3800 | 4200 | | | | 4200 | | 4200 | | |
| 8 | | | 3700 | | | | | 4100 | | 4100 | | |
| " | | | 3900 | | | | | 4200 | | | | |
| 9 | | | 3900 | | | | | 4200 | | | | |
| 10 | | 3600 | | 4100 | | 4200 | | | | | | |
| 11 | | 3400 | | 3700 | | 4100 | | 4200 | | | | |
| 12 | | 3300 | | 3700 | | 4000 | | 4000 | 4100 | 4200 | | |
| 13 | | 3200 | | 3500 | | 3600 | | 3700 | 3900 | 4100 | | 4200 |
| 14 | | | 3800 | 4000 | 4000 | 4000 | 4200 | | | | | |
| 14 Top | | 2700 | | 2700 | | | | 2700 | | 3000 | | 3300 |
| 14 Bottom | | 3600 | | 3900 | | 4200 | | 4200 | | | | |
| 15 | | 3400 | | 3800 | | 3600 | | 4100 | 4200 | | | |
| 15 Top | | | | 3800 | | | | 4000 | | 4200 | | 4200 |
| 15 Bottom | | 3400 | | 3700 | | 4200 | | 4200 | 4200 | | | |
| 16 | | | | | | | | | | 4200 | | |
| 17 | | | 3500 | | | | | 4100 | 4200 | | | |
| 21 | | | 4100 | | | | | 4200 | | | | |
| 22 | | | 3600 | | | | | 4200 | | | | |
| 22 | 3200 | | 3400 | | 3900 | | | 4200 | | | | |

TABLE III -Continued

CALCIUM CARBONATE DEPOSITION TEST
(Dosage in Parts Per Million)

| CHEMICAL | 3 | 4 | 5 | 6 | 7 | 8 | 9 | 10 | 15 | 20 | 30 | 50 |
|---|---|---|---|---|---|---|---|---|---|---|---|---|
| 23 | 3200 | | 3500 | | 3900 | | | 4000 | 4100 | 4200 | | |
| 23 | | | 3800 | | | | | 4200 | | 3400 | | 3500 |
| 24 | | | | | | | | | | | | |
| 24 | | | 3100 | | 3700 | | 4100 | 3500 | | | | |
| 25 | | 3400 | | | | | | 4200 | | | | |
| 26 | | 3400 | | | | | | 3600 | 3700 | | | |
| 29 | | | 4000 | 4100 | 4200 | | | | | | | |
| 33 | | | 4100 | 4200 | | | | | | | | |

I claim:

1. In a waterflood system in which water is added to one or more injection wells in order to force oil from underground formations to one or more producing wells, the process which comprises introducing into at least one of said injection wells a water flooding composition containing a scale inhibiting amount of an alkoxylated water-soluble acrylic acid polymer having a molecular weight within the range of 3,000 to 20,000, said acrylic acid polymer being alkoxylated with from 2–60% by weight of ethylene oxide or propylene oxide.

2. The method of claim 1 where the alkoxylated water-soluble polymer is an acrylic acid polymer which has been ethoxylated with from 2 to 60% by weight of ethylene oxide, said starting polymer having a molecular weight range of from 5,000 to 15,000.

* * * * *